United States Patent
Cracraft et al.

(10) Patent No.: US 9,706,709 B2
(45) Date of Patent: Jul. 18, 2017

(54) HARVESTER FAN SPEED CONTROL BASED ON YIELD

(71) Applicant: DEERE & COMPANY, Moline, IL (US)

(72) Inventors: Mark A. Cracraft, Johnston, IA (US); James W. Riesterer, Pleasant Hill, IA (US); Kevin J. Goering, Cambridge, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/849,978

(22) Filed: Sep. 10, 2015

(65) Prior Publication Data

US 2017/0071127 A1 Mar. 16, 2017

(51) Int. Cl.
*A01D 41/127* (2006.01)
*A01D 46/10* (2006.01)
*A01D 61/00* (2006.01)
*A01D 46/08* (2006.01)
*A01D 101/00* (2006.01)

(52) U.S. Cl.
CPC ....... *A01D 41/1271* (2013.01); *A01D 41/127* (2013.01); *A01D 41/1276* (2013.01); *A01D 46/085* (2013.01); *A01D 46/10* (2013.01); *A01D 61/008* (2013.01); *A01D 2101/00* (2013.01)

(58) Field of Classification Search
CPC combination set(s) only.
See application file for complete search history.

(56) References Cited

U.S. PATENT DOCUMENTS

| 4,466,230 | A | 8/1984 | Osselaere et al. |
| 5,586,033 | A | 12/1996 | Hall |
| 5,775,072 | A * | 7/1998 | Herlitzius .......... A01D 41/1276 460/4 |
| 6,401,549 | B1 * | 6/2002 | Ohlemeyer .......... A01D 43/085 56/10.2 E |
| 6,508,049 | B1 * | 1/2003 | Cox ........................ A01D 45/10 56/10.2 R |
| 6,553,300 | B2 | 4/2003 | Ma et al. |
| 6,695,693 | B2 * | 2/2004 | Ho ........................ A01D 41/127 460/6 |
| 7,702,450 | B2 | 4/2010 | Pfohl et al. |
| 8,095,280 | B2 | 1/2012 | Price |
| 8,746,158 | B2 * | 6/2014 | Binsirawanich .......... G01F 1/74 111/174 |
| 2007/0299591 | A1 * | 12/2007 | Goering ............... A01D 46/085 701/50 |
| 2013/0061790 | A1 * | 3/2013 | Binsirawanich ....... A01C 7/081 111/174 |

* cited by examiner

*Primary Examiner* — Alicia Torres

(57) ABSTRACT

A harvester having a harvesting structure for harvesting crop and a crop receptacle for receiving harvested crop. The harvester comprises a crop conveying fan configured to operate at a fan speed to facilitate transfer of harvested crop from the harvesting structure to the crop receptacle. A control system for controlling the fan speed based on crop mass flow comprises a crop mass flow feedback device that provides a crop mass flow feedback signal indicative of crop mass flow. A controller is in communication with the crop mass flow feedback device and is configured to automatically lower the fan speed when the crop mass flow feedback signal indicates a lower crop mass flow and automatically raise the fan speed when the crop mass flow feedback signal indicates a higher crop mass flow.

19 Claims, 4 Drawing Sheets

HARVESTER FAN SPEED CONTROL BASED ON YIELD

FIELD OF THE DISCLOSURE

The present disclosure generally relates to harvesters, and more particularly to a system and method for controlling harvester fan speed based on yield.

BACKGROUND OF THE DISCLOSURE

In order to harvest crops, engine and fan speeds of harvesters are commonly set at constant speeds regardless of yield.

SUMMARY OF THE DISCLOSURE

In one embodiment, a harvester having a harvesting structure for harvesting crop and a crop receptacle for receiving harvested crop is disclosed. The harvester comprises a crop conveying fan configured to operate at a fan speed to facilitate transfer of harvested crop from the harvesting structure to the crop receptacle. A control system for controlling the fan speed based on crop mass flow comprises a crop mass flow feedback device that provides a crop mass flow feedback signal indicative of crop mass flow. A controller is in communication with the crop mass flow feedback device and is configured to automatically lower the fan speed when the crop mass flow feedback signal indicates a lower crop mass flow and automatically raise the fan speed when the crop mass flow feedback signal indicates a higher crop mass flow.

In another embodiment, a method for harvesting crop with a harvester having a harvesting structure for harvesting crop and a crop receptacle for receiving harvested crop is disclosed. The method comprises providing a crop conveying fan operating at a fan speed to facilitate transfer of harvested crop from the harvesting structure to the crop receptacle. Power is supplied to the crop conveying fan with a power module. A control system is provided that comprises a crop mass flow feedback device providing a crop mass flow feedback signal indicative of crop mass flow. A controller is in communication with the crop mass flow feedback device and configured to automatically lower the fan speed when the crop mass flow feedback signal indicates a lower crop mass flow and automatically raise the fan speed when the crop mass flow feedback signal indicates a higher crop mass flow.

In yet another embodiment, a harvester having a harvesting structure for harvesting crop and a crop receptacle for receiving harvested crop is disclosed. The harvester comprises a power module for providing power. A hydrostatic system is configured to compensate for the power provided by the power module to maintain a desired harvester speed and a desired harvesting structure speed. A crop conveying fan is configured to operate at a fan speed to facilitate transfer of harvested crop from the harvesting structure to the crop receptacle. A control system comprises a crop mass flow feedback device that provides a crop mass flow feedback signal indicative of crop mass flow. A controller is in communication with the crop mass flow feedback device and the power module. The controller is configured to automatically decrease the power from the power module to lower the fan speed when the crop mass flow feedback signal indicates a lower crop mass flow and automatically increase the power from the power module to raise the fan speed when the crop mass flow feedback signal indicates a higher crop mass flow.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
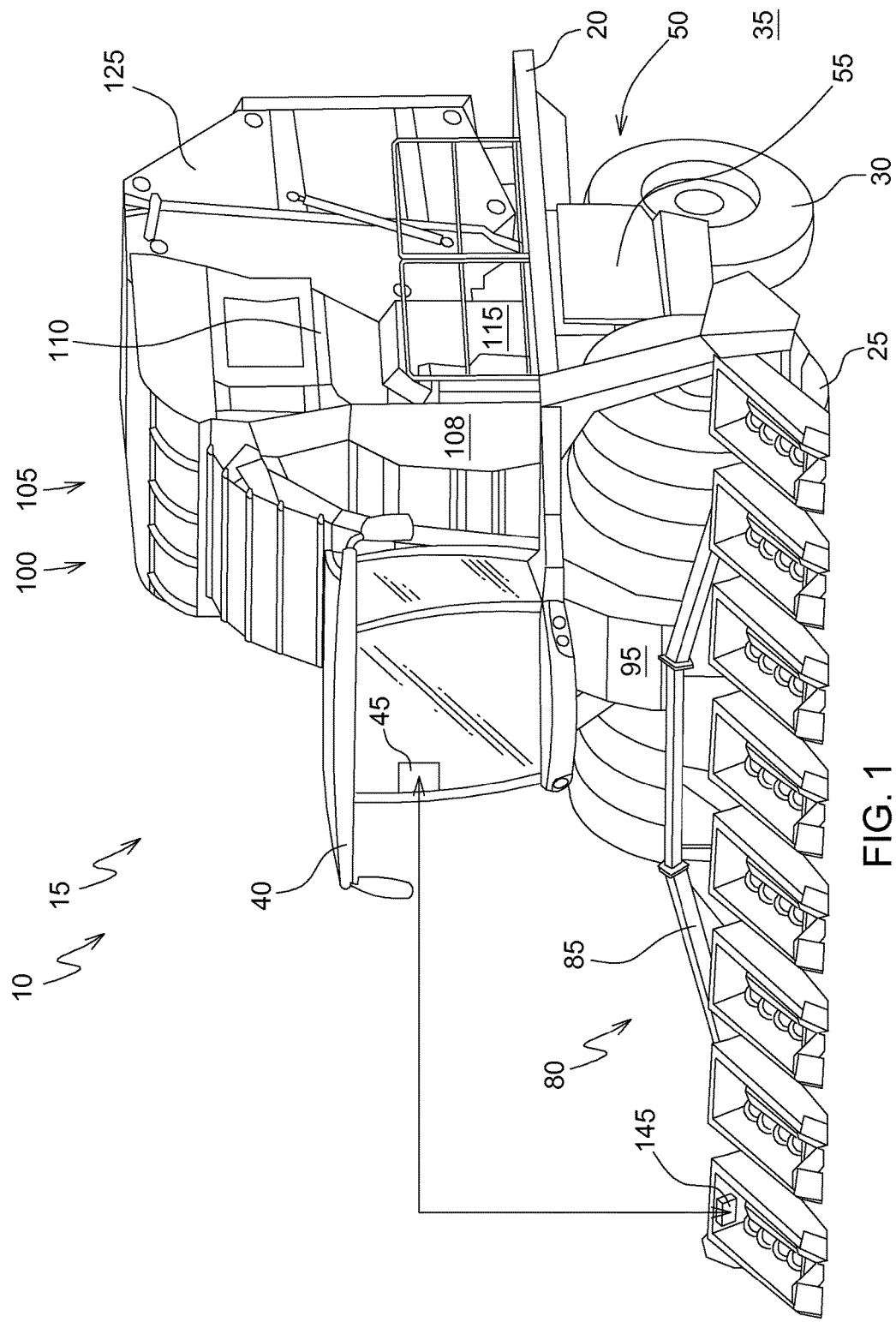
FIG. 1 is a perspective view of a harvester according to one embodiment.
Figure 2:
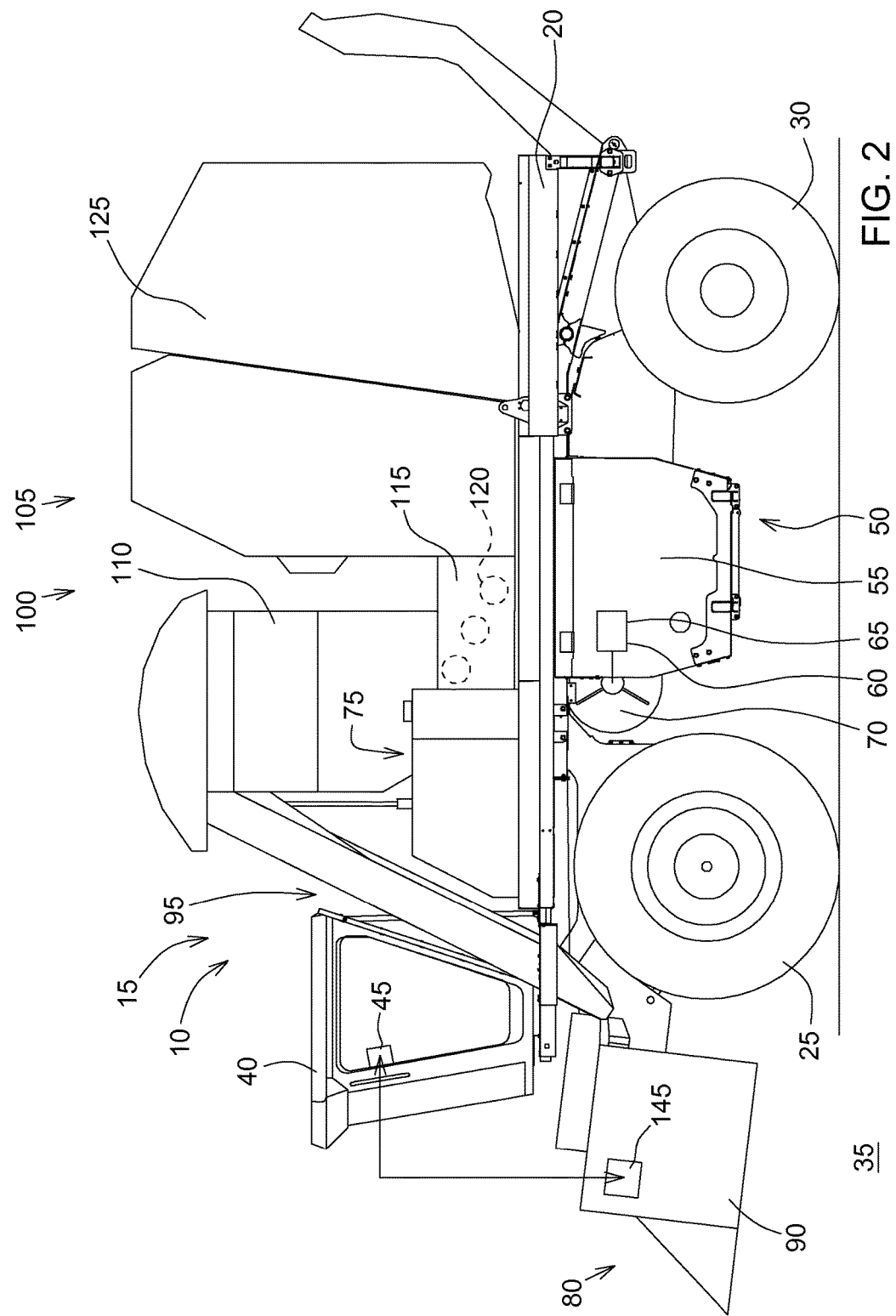
FIG. 2 is a side view of a harvester according to another embodiment.

FIGS. 1 and 2 illustrate a harvester 10. The illustrated harvester 10 is a cotton harvester 15 (e.g., cotton picker, cotton stripper). Other types of harvesters 10 are contemplated by this disclosure (e.g., combine).

The harvester 10 includes a chassis 20. The illustrated chassis 20 is supported by front wheels 25 and rear wheels 30 although other support is contemplated (e.g., tracks). The harvester 10 is adapted for movement through a field 35 to harvest crops (e.g., cotton, corn, stover, hay, and alfalfa). An operator station 40 is supported by the chassis 20. An operator interface 45 is positioned in the operator station 40.

Referring to FIG. 2, a power module 50 may be supported below the chassis 20. The power module may be an engine 55 that drives a hydraulic motor 60 or a mechanical drive 65 to power a crop conveying fan 70. An operator may set a minimum power for the power module 50 from the operator interface 45. The operator may also set a minimum engine speed from the operator interface 45. Water, lubricant, and fuel tanks, indicated generally at 75, may be supported on the chassis 20.

A harvesting structure 80 is coupleable to the chassis 20. The illustrated harvesting structure 80 is configured to remove cotton from the field 35. The harvesting structure 80 may be a cotton stripper header 85 (FIG. 1), one or more cotton picking units 90 (FIG. 2), or another harvesting structure 80 (e.g., corn head). Alternatively, the harvesting structure 80 may be configured to remove corn, or other crop.

With reference to FIGS. 1 and 2, an air duct system 95 is coupleable to the harvesting structure 80. A crop receptacle 100 is coupleable to the air duct system 95. Referring to FIG. 1, the illustrated crop receptacle 100 is a round module builder 105. Alternatively, the crop receptacle 100 may be a basket (not shown). The illustrated round module builder 105 includes a cleaner 108 that cleans the cotton harvested from the cotton stripper header 85 by removing trash and debris. With reference to FIG. 2, the round module builder 105 includes an accumulator 110 that is configured to receive cotton, or other crop, harvested by the cotton picking units 90.

With continued reference to FIG. 2, a feeder 115 is coupleable to the chassis 20. The feeder 115 is configured to receive cotton, or other crop, from the accumulator 110. The feeder 115 includes a plurality of rollers 120 configured to compress the cotton, or other crop, and transfer the cotton, or other crop, to a baler 125 of the round module builder 105.

Figure 3:
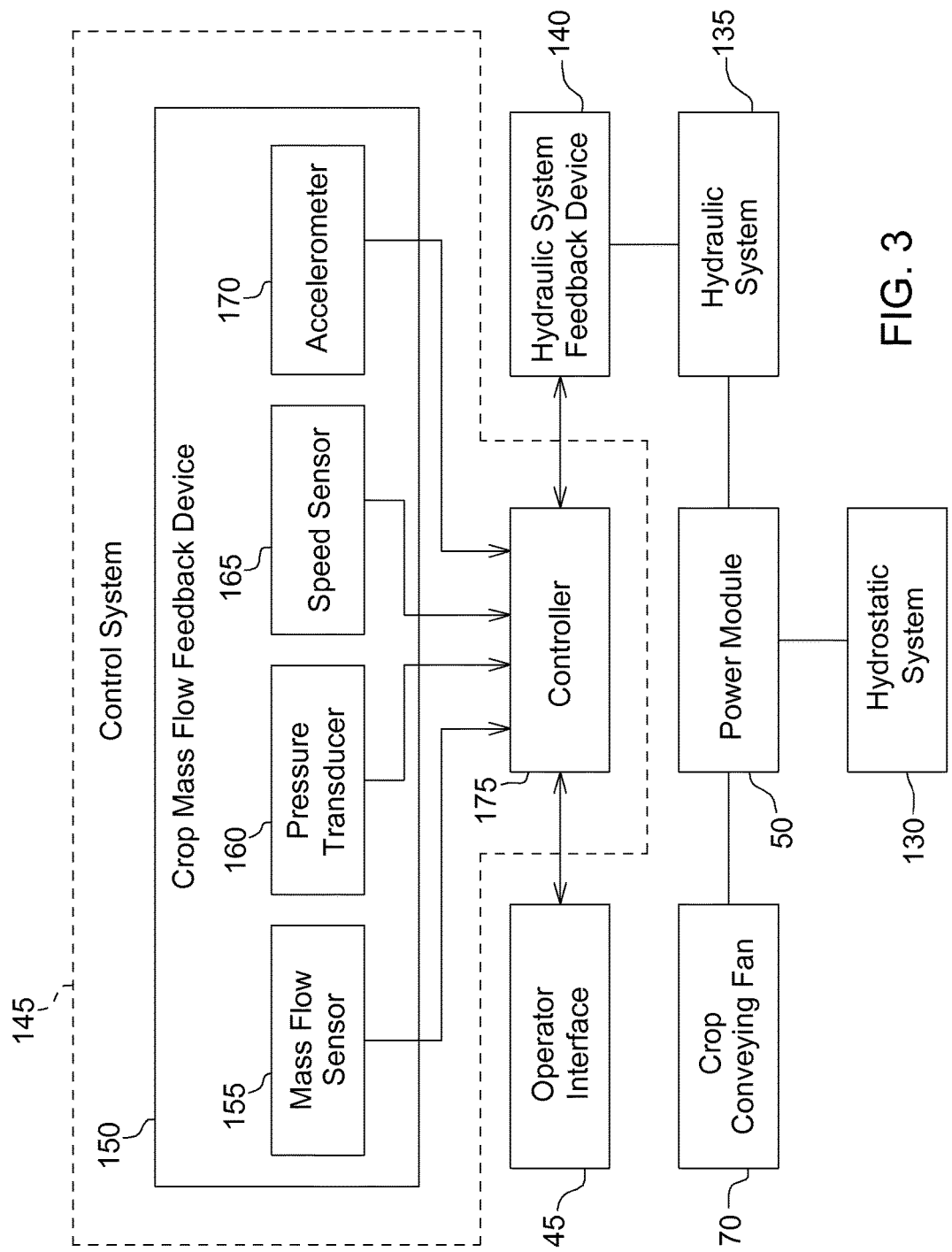
FIG. 3 is a schematic of a control system of a harvester according to yet another embodiment.

Referring to FIG. 3, the harvester 10 has a hydrostatic system 130. The hydrostatic system 130 is configured to compensate for the power provided by the power module 50 to maintain a desired harvester speed and a desired harvesting structure speed.

The harvester 10 has a hydraulic system 135. A hydraulic system feedback device 140 provides a hydraulic system signal indicative of hydraulic demand.

The harvester 10 has a control system 145 for controlling a fan speed of the crop conveying fan 70 based on crop mass flow. The control system 145 includes a crop mass flow feedback device 150. The crop mass flow feedback device 150 provides a crop mass flow feedback signal indicative of crop mass flow.

The crop mass flow feedback device 150 may be a mass flow sensor 155 that provides a mass flow rate or a mass speed as a crop mass flow feedback signal. The mass flow sensor 155 may be the sensor currently available with Harvest Doc™ available from John Deere. Alternatively, the crop mass flow feedback device 150 may be a pressure transducer 160 coupled to the harvesting structure 80. The pressure transducer 160 may provide a harvesting structure drive pressure as a crop mass flow feedback signal. The crop mass flow feedback device 150 may be a speed sensor 165 coupled to the harvesting structure 80. The speed sensor 165 may provide the difference between an actual harvesting structure speed and a commanded harvesting structure speed. Alternatively, the crop mass flow feedback device 150 may be an accelerometer 170 coupled to the harvesting structure 80. The accelerometer 170 may provide the acceleration change of the harvesting structure 80. Alternatively, the crop mass flow feedback device 150 may be any combination of the mass flow sensor 155, the pressure transducer 160, the speed sensor 165, and the accelerometer 170.

A controller 175 is in communication with the crop mass flow feedback device 150 and is configured to automatically lower the fan speed when the crop mass flow feedback signal indicates a lower crop mass flow and automatically raise the fan speed when the crop mass flow feedback signal indicates a higher crop mass flow. The controller 175 may be in communication with the power module 50. The controller 175 may decrease the power from the power module 50 to lower the fan speed and increase the power from the power module 50 to raise the fan speed. The relationship between power (measured in hp) and fan speed (measured in rpm) is $hp2/hp1=(rpm2/rpm1)^3$. This relationship illustrates that power can be significantly impacted by fan speed and average power is directly proportional to operating cost. Therefore, optimizing fan speed leads to optimized power and fuel efficiency. The controller 175 may be in communication with the hydraulic system feedback device 140 and may be configured to automatically raise the power from the power module 50 to a minimum power to support the hydraulic demand.

Figure 4:
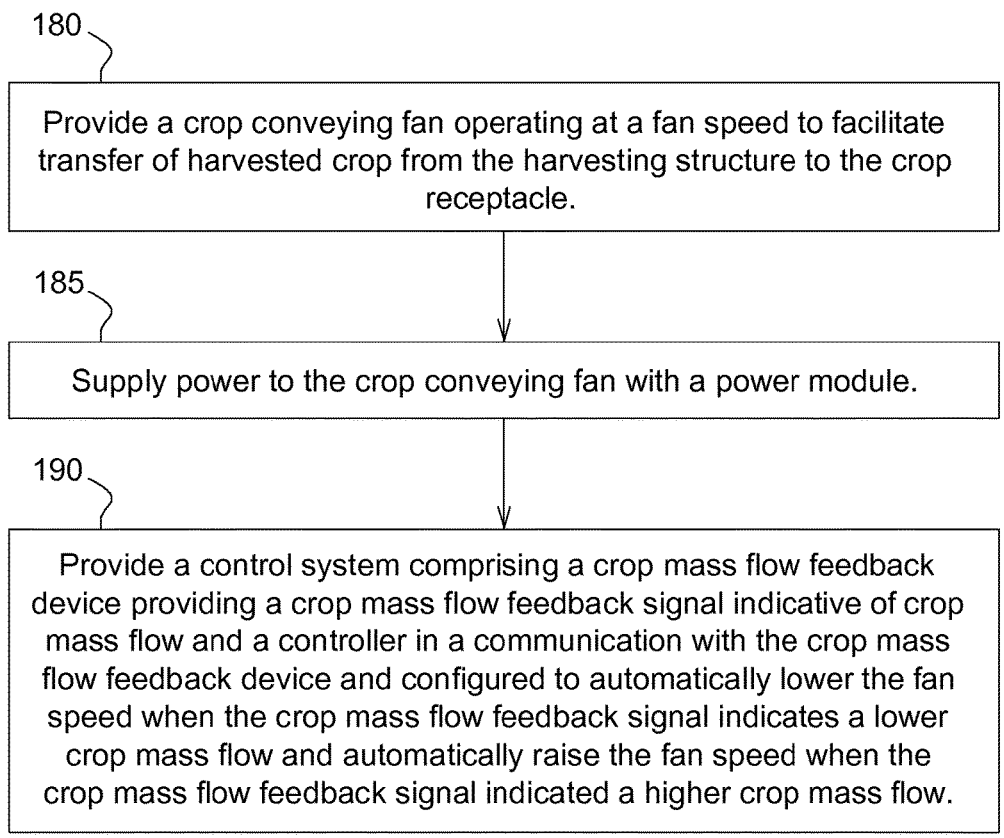
FIG. 4 is a schematic of an illustrative method for harvesting crop.

A method for harvesting crop with the harvester 10 having the harvesting structure 80 and the crop receptacle 100 for receiving harvested crop is illustrated in FIG. 4. In step 180, the crop conveying fan 70 is provided and configured to operate at the fan speed to facilitate transfer of harvested crop from the harvesting structure 80 to the crop receptacle 100. In step 185, power is supplied from the power module 50 to the crop conveying fan 70. In step 190, the control system 145 is provided that includes the crop mass flow feedback device 150 that provides the crop mass flow feedback signal indicative of crop mass flow. The control system 145 also includes the controller 175 that is in communication with the crop mass flow feedback device 150 and configured to automatically lower the fan speed when the crop mass flow feedback signal indicates a lower crop mass flow and automatically raise the fan speed when the crop mass flow feedback signal indicates a higher crop mass flow.

Various features are set forth in the following claims.

What is claimed is:

1. A harvester having a harvesting structure for harvesting crop and a crop receptacle for receiving harvested crop, the harvester comprising:
a crop conveying fan configured to operate at a fan speed to facilitate transfer of harvested crop from the harvesting structure to the crop receptacle by air;
a control system for controlling the fan speed based on crop mass flow, the control system comprising:
a crop mass flow feedback device for providing a crop mass flow feedback signal indicative of crop mass flow; and
a controller in communication with the crop mass flow feedback device and configured to automatically lower the fan speed when the crop mass flow feedback signal indicates a lower crop mass flow and automatically raise the fan speed when the crop mass flow feedback signal indicates a higher crop mass flow; and
a power module for supplying power to the crop conveying fan, the controller in communication with the power module and configured to decrease the power from the power module to lower the fan speed and increase the power from the power module to raise the fan speed.

2. The harvester of claim 1, wherein the power module is at least one of a hydraulic motor, a mechanical drive, and an engine.

3. The harvester of claim 1, further comprising a hydraulic system and a hydraulic system feedback device providing a hydraulic system signal indicative of hydraulic demand, the controller in communication with the hydraulic system feedback device and configured to automatically raise the power from the power module to a minimum power to support the hydraulic demand.

4. The harvester of claim 3, further comprising an operator interface where an operator can set the minimum power.

5. The harvester of claim 1, wherein the crop mass flow feedback device is a mass flow sensor and the crop mass flow feedback signal is at least one of a mass flow rate and a mass speed.

6. The harvester of claim 1, wherein the crop mass flow feedback device is a pressure transducer coupled to the harvesting structure, the mass flow feedback signal is a harvesting structure drive pressure.

7. The harvester of claim 1, wherein the crop mass flow feedback device is a speed sensor coupled to the harvesting structure, the mass flow feedback signal is the difference between an actual harvesting structure speed and a commanded harvesting structure speed.

8. The harvester of claim 1, wherein the crop mass flow feedback device is an accelerometer coupled to the harvesting structure, the mass flow feedback signal is the acceleration change of the harvesting structure.

9. The harvester of claim 1, wherein the harvester is a cotton harvester and the harvesting structure is at least one of a cotton picking unit and a cotton stripper header and the crop receptacle is a module builder.

10. A harvester having a harvesting structure for harvesting crop and a crop receptacle for receiving harvested crop, the harvester comprising:
a power module for providing power;
a hydrostatic system configured to compensate for the power provided by the power module to maintain a desired harvester speed and a desired harvesting structure speed;
a crop conveying fan configured to operate at a fan speed to facilitate transfer of harvested crop from the harvesting structure to the crop receptacle by air;
a control system comprising:
a crop mass flow feedback device for providing a crop mass flow feedback signal indicative of crop mass flow; and
a controller in communication with the crop mass flow feedback device and the power module, the controller configured to automatically decrease the power from the power module to lower the fan speed when the crop mass flow feedback signal indicates a lower crop mass flow and automatically increase the power from the power module to raise the fan speed when the crop mass flow feedback signal indicates a higher crop mass flow.

11. The harvester of claim 10, wherein the power module is at least one of a hydraulic motor, a mechanical drive, and an engine.

12. The harvester of claim 10, further comprising a hydraulic system and a hydraulic system feedback device for providing a hydraulic system signal indicative of hydraulic demand, the controller in communication with the hydraulic system feedback device and configured to automatically raise the power from the power module to a minimum power to support the hydraulic demand.

13. The harvester of claim 10, further comprising an operator interface where an operator can set a minimum engine speed.

14. The harvester of claim 10, wherein the crop mass flow feedback device is a mass flow sensor and the crop mass flow feedback signal is at least one of a mass flow rate and a mass speed.

15. The harvester of claim 10, wherein the crop mass flow feedback device is a pressure transducer coupled to the harvesting structure, the mass flow feedback signal is a harvesting structure drive pressure.

16. The harvester of claim 10, wherein the crop mass flow feedback device is a speed sensor coupled to the harvesting structure, the mass flow feedback signal is the difference between an actual harvesting structure speed and a commanded harvesting structure speed.

17. The harvester of claim 10, wherein the crop mass flow feedback device is an accelerometer coupled to the harvesting structure, the mass flow feedback signal is the acceleration change of the harvesting structure.

18. The harvester of claim 10, wherein the harvester is a cotton harvester and the harvesting structure is at least one of a cotton picking unit and a cotton stripper header.

19. The harvester of claim 1, comprising a crop path from the harvesting structure to the crop receptacle, and the crop conveying fan is positioned outside the crop path.

* * * * *